(12) United States Patent
Mo

(10) Patent No.: US 6,413,217 B1
(45) Date of Patent: Jul. 2, 2002

(54) ULTRASOUND ENLARGED IMAGE DISPLAY TECHNIQUES

(75) Inventor: Larry Y. L. Mo, Waukesha, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/539,203

(22) Filed: Mar. 30, 2000

(51) Int. Cl.⁷ .................................................. A61B 8/00
(52) U.S. Cl. ...................................................... 600/440
(58) Field of Search ................................. 600/437–438, 600/440, 441, 443, 447

(56) References Cited

U.S. PATENT DOCUMENTS

| 5,390,674 A | 2/1995 | Robinson et al. |
| 5,509,415 A | 4/1996 | Saunders et al. |
| 5,827,189 A | 10/1998 | Mo et al. |
| 5,873,830 A | 2/1999 | Hossack et al. |
| 6,063,032 A | * 5/2000 | Grunwald ................... 600/440 |
| 6,248,073 B1 | * 6/2001 | Gilbert et al. .............. 600/443 |

FOREIGN PATENT DOCUMENTS

| EP | 0 707 219 B1 | 4/1996 |
| EP | 0707219 B1 | 4/1996 |

* cited by examiner

*Primary Examiner*—Francis J. Jaworski
(74) *Attorney, Agent, or Firm*—McAndrews, Held & Malloy; Peter J. Vogel; Michael A. Dellapenna

(57) ABSTRACT

In an ultrasound scanner (90), signals responsive to received ultrasound waves are processed by a B-mode processor (222) and a computer (232). The data processed by the B-mode processor (222) is used to generate a display of a reference image in an area (120) of a display (100), and the data processed by the computer (232) is used to generate a region of interest (140) of the reference image and an enlarged image corresponding to the region of interest in another area (150) of the display (100), thereby improving the spatial resolution and frame rate of the displayed images.

16 Claims, 3 Drawing Sheets

ULTRASOUND ENLARGED IMAGE DISPLAY TECHNIQUES

BACKGROUND OF THE INVENTION

This invention relates to ultrasound displays, and more particularly relates to such displays in which a region of interest can be identified.

Most state-of-the-art ultrasound scanners feature one or more zoom display modes. In a basic zoom mode, a region of interest (ROI) is selected via trackball control, which is magnified to the full display image area when a zoom button is pressed. The ROI magnification can be implemented simply by interpolating up the video image in the backend processor of the scanner. While this enlarges the display area for the ROI, it does not improve the fundamental resolution of the anatomy.

An "acoustic zoom" is often used to provide a higher resolution zoom image. This is accomplished by increasing the data bandwidths (not just display pixel count) in the lateral and axial dimensions. In accordance with standard image sampling theory, an increased spatial bandwidth in either dimension generally requires a corresponding increase in the data sampling rate. For ultrasound systems, this means that the vector density, axial sampling rate, and their corresponding filter bandwidths, should always be linked to the image display size. Examples of specific implementations are taught in U.S. Pat. No. 5,509,415 entitled "Method for reducing vector density based on image size," and in European Patent No. EP 0707219B1 entitled "Ultrasound diagnostic imaging with enhanced zoom." For an acoustic zoom, higher lateral display resolution is often obtained by increasing the beam vector density (e.g. 2x) within the ROI. An increased axial display bandwidth (resolution) usually involves reducing the post-detection low pass filtering before scan conversion.

In either display or acoustic zoom, the entire image display area is used to display the enlarged ROI image. The limitation is that the user loses sight of the original "big picture" which often contains useful contextual information that may help interpret detailed anatomical information in the zoom image.

A number of solutions have been developed to provide a reference image in zoom mode. A commonly available method is to keep in the monitor display a highly reduced version of the original image with the ROI highlighted for easy reference. This reference image may or may not be frozen.

Another relatively new "picture-over-picture" (POP) display zoom for B-mode shows a magnified (e.g. 2x) view of an ROI box over the original full-size B-mode image (to be referred to as the reference image hereafter). This is adapted from the sub-window display capabilities of modern television sets. One important aspect of the POP mode is that both the reference image and POP zoom display are live images. The ROI box can be moved anywhere in the reference image via trackball control. The POP display zoom box is automatically positioned within the image display area such that it does not obstruct the smaller ROI box in the reference image. The advantage of the POP display zoom is that the live and magnified image can be generated instantly simply by interpolating up the ROI in the reference image; i.e., it is a pure post-processing operation. The disadvantage of such a display 2x zoom is that the POP image often looks blurry compared to the ROI in the reference image.

In an acoustic zoom mode, the reference image is either not available (zoomed-up image takes up the entire display), or frozen and reduced in size. To provide a live acoustic POP zoom (with increased vector density), and a live reference image, the scanner would need to alternate between acoustic zoom firings and reference image firings, which would likely reduce the image frame rate.

U.S. Pat. No. 5,873,830 (Hossack et al., issued Feb. 23, 1999) describes a technique which consists of using different imaging parameters for an ROI within a larger background image. The imaging parameters may be optimized to increase resolution or frame rate etc. This is not to be confused with a zoom feature because the ROI is not magnified for display. The present invention addresses the problems which are unresolved by the above-described techniques and provides a high resolution enlarged image which solves these problems.

BRIEF SUMMARY OF THE INVENTION

The preferred embodiment is useful in an ultrasound scanner in order to create a reference image derived from scanning a subject under study with ultrasound waves and to simultaneously display an enlarged image corresponding to a selected region of interest of the reference image. In such an environment, the preferred embodiment generates received signals in response to ultrasound waves backscattered from the subject, preferably by use of a receive unit. First display signals corresponding to the reference image are generated in response to the received signals, preferably by a first logic unit. Second display signals corresponding to the enlarged image are generated in response to the received signals independent of the generating of the first display signals, preferably by a second logic unit. The reference image is displayed in response to the first display signals, preferably on a display, and the enlarged image is displayed in response to said second display signals, preferably on the display.

By using the foregoing techniques, an enlarged image can be displayed with a reference image with a degree of spatial resolution and rapid frame rate previously unattainable.

DETAILED DESCRIPTION OF THE INVENTION

Figure 1:
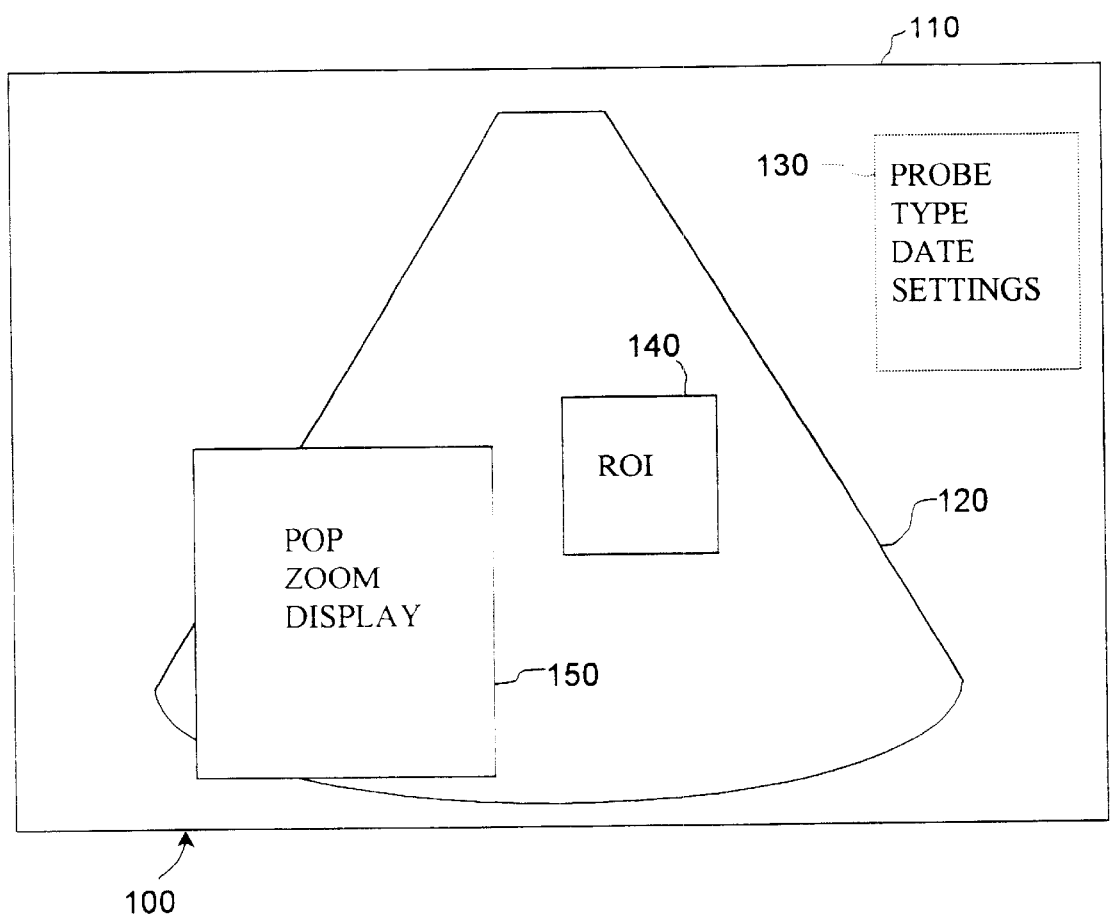
FIG. 1 is a schematic diagram of a preferred form of display suitable for use in connection with present invention.

Referring to FIG. 1, the preferred embodiment includes an apparatus and a method of achieving a POP zoom mode with improved spatial resolution similar to that of an acoustic zoom, but without any frame rate hit. The preferred embodiment is applicable to both B-mode (including B-Flow mode) and color flow images. The preferred embodiment is best implemented on a platform which consists of parallel data processing pipelines for the reference image and the POP zoom image data.

More specifically, still referring to FIG. 1, the preferred embodiment includes a display 100 having a display face 110 on which a reference image is displayed in, for example, a sector scan format 120. Information about the probe in use, type of scan, date and scanner settings may be displayed in another display area 130. A region of interest (ROI) in the reference image can be indicated by a rectangular box 140. An enlarged zoom image corresponding to the region of interest is displayed in a zoom area 150 which is superimposed on the reference image in area 120. Area 150 is separated from area 140 so that both the region of interest and enlarged zoom image may be simultaneously viewed. In addition, a substantial portion of the reference image in area 120 can be viewed simultaneously with the enlarged zoom image in area 150. The enlarged zoom image in area 150 preferably is about a two times (2×) enlargement of the region of interest in area 140.

Figure 2:
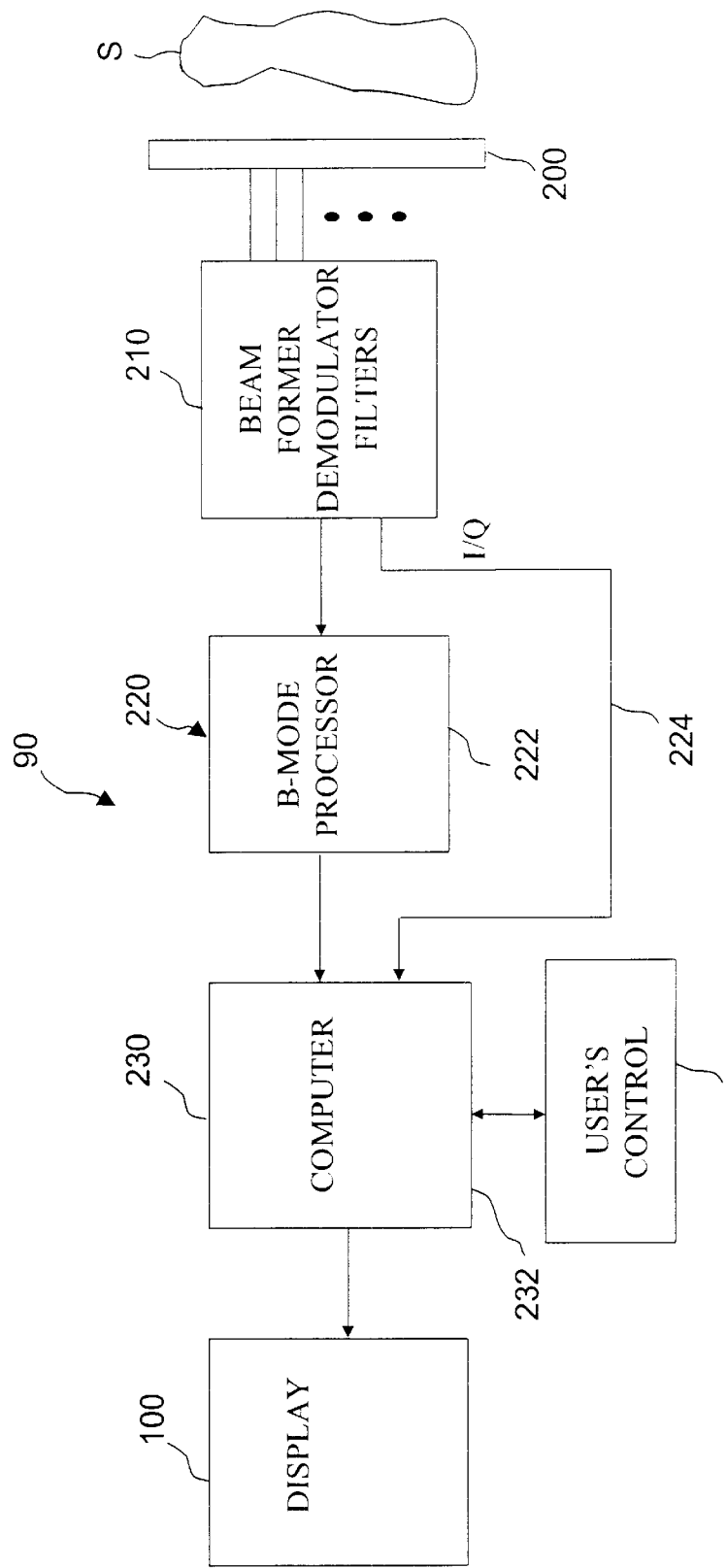
FIG. 2 is a schematic block diagram of a preferred form of the present invention, including a B-mode processor and a computer.

Referring to FIG. 2, display 100 is included within an ultrasound scanner 90 including a conventional ultrasound transducer 200 which generates ultrasound waves that are transmitted to a subject S under study. Ultrasound waves are backscattered from subject S to transducer 200 in a well known manner. Transducer 200 generates corresponding transducer signals which are transmitted to a receive unit 210 that includes a beam former, a demodulator and one or more filters. The receive unit generates received signals in response to the transducer signals received from transducer 200. The received signals are in the form of beamformed radio frequency (RF) signals or equivalent I/Q data signals which are fed into a logic unit 220, preferably in the form of a B-mode processor 222 that processes the reference B-mode image displayed in area 120 of display 100. A dedicated B-mode processor is often needed due to the high data throughput for the reference B-mode image which may consist of multiple focal zones and a large number of vectors per frame.

A separate processing path 224 is used to process the I/Q data resulting in the image displayed within the ROI in area 140 of display 100. Since the ROI is restricted in size, the data throughput requirement is much reduced. Hence, the ROI data can be processed by another logic unit 230 preferably in the form of a computer 232 in the backend of scanner 90. Computer 232 generally consists of one or more central processing units (CPUs) and a large memory block to store the I/Q data and also processed data to support CINE playback. The CPUs coordinate all the data transfer activities of scanner 90, and perform the ROI data processing of the data on path 224, scan conversion and video processing, which includes displaying the image in ROI area 140 and overlaying the zoomed-up ROI image in area 150 onto the reference image in area 120 as shown in the example of FIG. 1.

Logic units 220 and 230 may comprise a variety of devices in addition to B-mode processor 222 and computer 232. For example, the logic units may include microprocessors, digital signal processors, and a variety of application specific integrated circuits capable of logical and arithmetic operations.

A conventional user's control 240 changes the location of ROI area 140 and may alter the data in area 130 in a well known manner.

Figure 3:
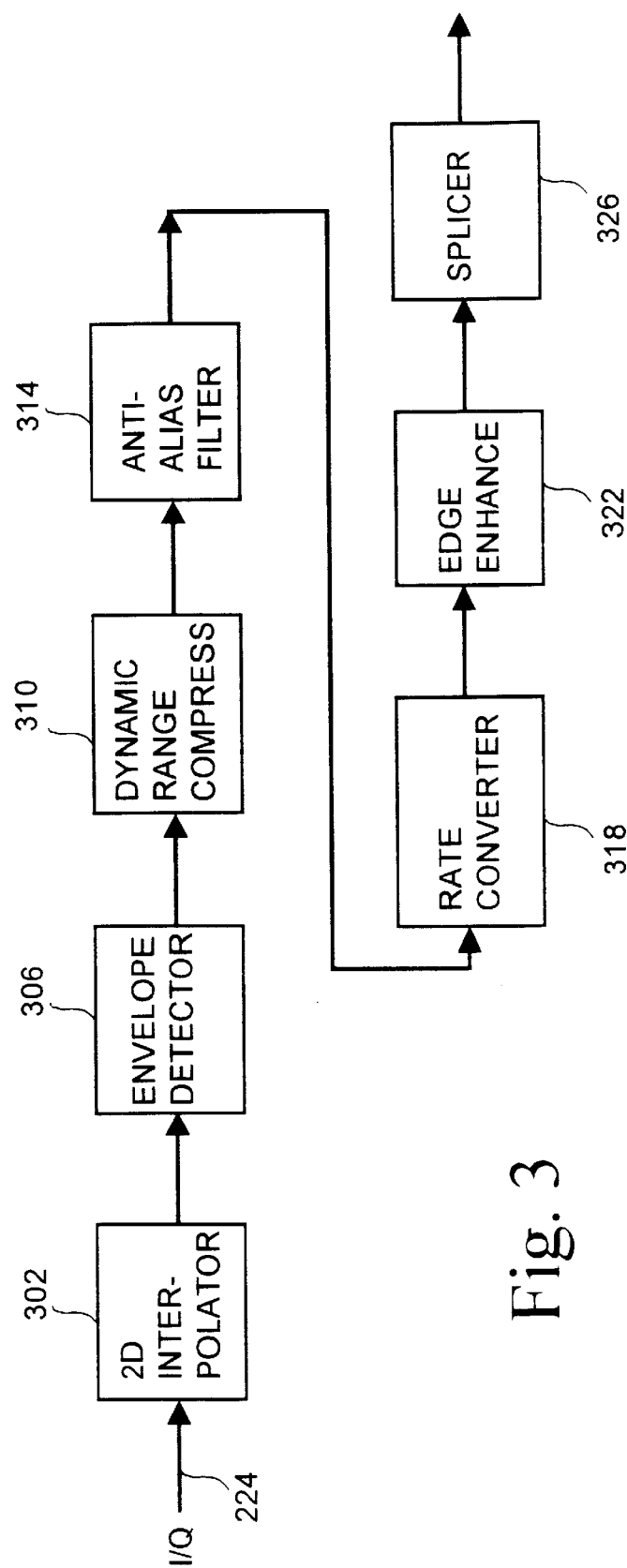
FIG. 3 is a schematic block diagram of the B-mode processor shown in FIG. 2.

FIG. 3 shows a block diagram of the basic processing steps for each receive beam or vector in system 90. These processing steps are implemented (in hardware and/or software) both on the dedicated B-mode processor 222 and on the computer 232 shown in FIG. 2.

Still referring to FIG. 3, a 2D interpolator 302 can be used to increase the data rate along each vector in the manner described in U.S. Pat. No. 5,827,189, or to generate an additional vector in between each pair of received vectors in the manner described in U.S. Pat. No. 5,390,674. U.S. Pat. No. 5,827,189 is assigned to the parent of the assignee of the present application and is incorporated by reference in this application. Such an interpolator often is needed to prevent axial and/or lateral spatial aliasing respectively, after envelope detection. Interpolator 302 generates interpolated signals which are processed by an envelope detector 306 which basically computes the power of the received signal, $I^2+Q^2$, in order to generate detected signals. The detected signals are compressed (e.g. logarithmic compression) by a dynamic range compressor 310 to reduce their amplitude dynamic range for video display which typically has 8-bit resolution. Compressor 310 generates compressed signals which are filtered by an anti-alias filter 314 in order to generate filtered compressed signals that may be downsampled by a rate converter 318 depending on whether the vector length is larger than the number of display pixels along the range direction. The downsampled converted data is then passed through an edge enhancer 322 which is typically a high pass filter that enhances edge data in the image. Edge enhancer 322 generates enhanced signals which are processed by a splicer 326, which holds the data for different transmit focal zones and then "stitches" them together to form a single scan line. While these processing steps shown in FIG. 3 are basic to conventional B-mode, the point to keep in mind is that most of the signal block parameters, such as interpolation factors in the 2D interpolator, anti-alias filter cutoff, the decimation rate in the rate converter, and edge enhance filtering, are dependent on the display image size in terms of pixel count for a given receive vector length. Hence, in zoom mode, the optimal processing parameters for the ROI data are generally different from those of a non-zoom image.

The power of the dual pipeline platform of FIG. 2 (i.e., the use of logic units 220 and 230) lies in the ability to process the ROI data independent from that of the reference B-mode data. In other words, processor 222 processes the data resulting in the image of area 120 independent from the data processing of computer 232 resulting in the displays in areas 140 and 150. For example, if more vectors are needed to fill the zoom image display area 150, then vector interpolation is performed prior to detection. Along the axial dimension, the post-detection smoothing filter and decimation rate should be chosen based on the axial dimension of the zoom image display in area 150 (and not the reference image display in area 120). If there are more display pixels than sample points available even without any decimation, then axial interpolation is performed prior to detection to generate more sample points to fill the zoom image display in area 150. The key to the high resolution POP zoom is that any axial and/or lateral interpolation needed is performed prior to detection. Any post-processing, such as edge enhance filtering and frame averaging, also will be optimized based on the POP data rates, independent of those for the reference image path through processor 222.

All color flow (velocity, variance or power modes) processing is performed on computer 232 in FIG. 2. The software for color processing is designed to support parallel but independent processing of the color reference image in area 140 and the zoom ROI color image in area 150. Color flow processing is not new and involves similar data interpolation, decimation and filtering steps as B-mode.

One feature of the preferred embodiment is the ability to apply different processing parameters for the reference image in area 120 and ROI color image in areas 140 and 150 based on the respective display image sizes.

Those skilled in the art will recognize that the preferred embodiments may be altered and modified without departing from the true spirit and scope of the invention as defined in the accompanying claims.

What is claimed is:

1. In an ultrasound scanner, apparatus for creating a reference image derived from scanning a subject under study with ultrasound waves and for simultaneously displaying an enlarged image corresponding to a selected region of interest of said reference image comprising in combination:
   a receive unit arranged to generate received signals in response to ultrasound waves backscattered from said subject;
   a first logic unit responsive to said received signals to generate first display signals corresponding to said reference image;
   a second logic unit in parallel with the first logic unit and responsive to said received signals to generate second display signals corresponding to said enlarged image, the generating of the second display signals being independent of the generating of the first display signals; and
   a display responsive to said first display signals to display said reference image and responsive to said second display signals to display said enlarged image.

2. Apparatus, as claimed in claim 1, wherein said receive unit comprises a beam former, a demodulator and one or more filters.

3. Apparatus, as claimed in claim 1, wherein said first logic unit comprises a B-mode processor.

4. Apparatus, as claimed in claim 1, wherein said second logic unit comprises a computer.

5. Apparatus, as claimed in claim 1, wherein said reference image and said enlarged image are displayed simultaneously.

6. Apparatus, as claimed in claim 1, wherein said second logic unit performs color flow processing.

7. Apparatus, as claimed in 1, wherein the first logic unit processes the received signals independent of the second logic unit and wherein the second logic unit processes the received signals independent of the first logic unit.

8. In an ultrasound scanner, a method of creating a reference image derived from scanning a subject under study with ultrasound waves and of simultaneously displaying an enlarged image corresponding to a selected region of interest of said reference image comprising in combination:
   generating received signals in response to ultrasound waves backscattered from said subject;
   generating first display signals corresponding to said reference image in response to said received signals;
   generating second display signals corresponding to said enlarged image in response to said received signals independent of said generating first display signals and in parallel with said generating first display signals;
   displaying said reference image in response to said first display signals; and
   displaying said enlarged image in response to said second display signals.

9. A method, as claimed in claim 8, wherein said generating received signals comprises demodulating said received signals and filtering said received signals.

10. A method, as claimed in claim 8, wherein said scanner comprises a computer and wherein said generating second display signals comprises processing said received signals with said computer.

11. A method, as claimed in claim 10, wherein said scanner comprises a B-mode processor and wherein said generating first display signals comprises processing said received signals with said B-mode processor.

12. A method, as claimed in claim 11, wherein said processing said received signals with said B-mode processor is independent of said processing said received signals with said computer.

13. A method, as claimed in claim 8, wherein said displaying comprises displaying said reference image and said enlarged image simultaneously.

14. A method, as claimed in claim 8, wherein said generating second display signals comprises color flow processing.

15. In an ultrasound scanner, apparatus for creating a reference image derived from scanning a subject under study with ultrasound waves and for simultaneously displaying an enlarged image corresponding to a selected region of interest of said reference image comprising in combination:
   a receive unit arranged to generate received signals in response to ultrasound waves backscattered from said subject;
   a first logic unit comprising a B-mode processor responsive to said received signals to generate first display signals corresponding to said reference image, said B-mode processor comprising
   a two dimensional interpolator;
   an envelope detector responsive to the output of said interpolator;
   a dynamic range compressor responsive to the output of said envelope detector;
   an anti-alias filter responsive to the output of said compressor;
   a rate converter responsive to the output of said filter;
   an edge enhancer responsive to the output of said converter; and
   a splicer responsive to the output of said enhancer;
   a second logic unit responsive to said received signals to generate second display signals corresponding to said enlarged image; and
   a display responsive to said first display signals to display said reference image and responsive to said second display signals to display said enlarged image.

16. In an ultrasound scanner comprising a computer and a B-mode processor, a method of creating a reference image derived from scanning a subject under study with ultrasound waves and of simultaneously displaying an enlarged image corresponding to a selected region of interest of said reference image comprising in combination:
   generating received signals in response to ultrasound waves backscattered from said subject;
   generating first display signals corresponding to said reference image in response to said received signals by processing said received signals with said B-mode processor by
      two dimensional interpolating of said received signals to form interpolated signals;
      envelope detecting said interpolated signals to form detected signals;
      dynamic range compressing said detected signals to form compressed signals;
      anti-alias filtering said compressed signals to form filtered compressed signals;
      rate converting said filtered compressed signals to form converted signals;
      edge enhancing said converted signals to form enhanced signals; and
      splicing said enhanced signals;
   generating second display signals corresponding to said enlarged image in response to said received signals independent of said generating first display signals by processing said received signals with said computer;
   displaying said reference image in response to said first display signals; and
   displaying said enlarged image in response to said second display signals.

* * * * *